I. SPAULDING.
Saw Set.
No. 13,964. Patented Dec. 18, 1855.
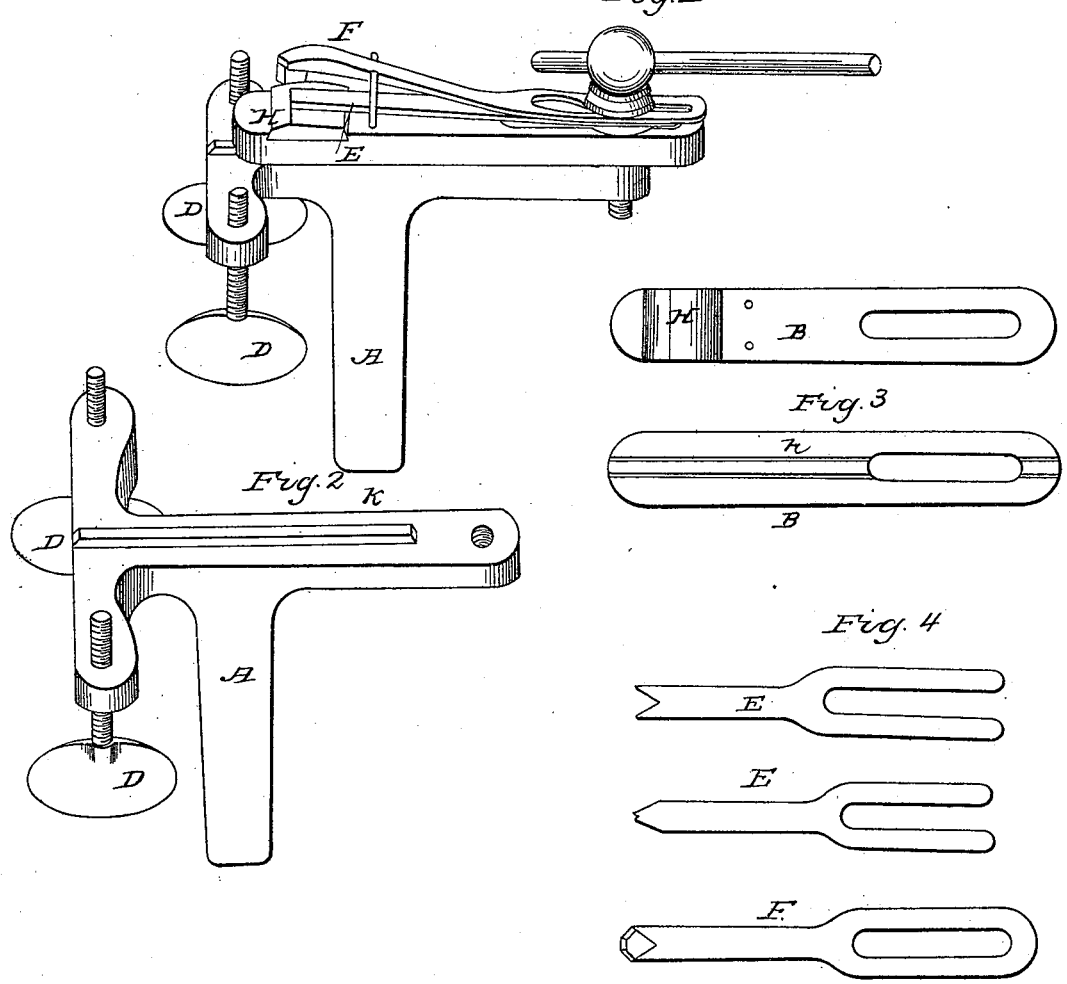

UNITED STATES PATENT OFFICE.

I. SPAULDING, OF SARATOGA SPRINGS, NEW YORK.

SAW-SET.

Specification of Letters Patent No. 13,964, dated December 18, 1855.

*To all whom it may concern:*

Be it known that I, ISAAC SPAULDING, of Saratoga Springs, in the county of Saratoga and State of New York, have invented certain new and useful Improvements in Saw-Sets; and I do hereby declare the following to be a full and exact description thereof, reference being had to the accompanying drawings, which form a part of the specification and to the letters of reference marked thereon.

The nature of my invention consists in providing a more perfect machine for giving a uniform and exact bend to the teeth of saws commonly called setting, which operates equally well on any sized teeth, than has heretofore been known or used.

To enable others skilled in the arts to make and use my invention, I will proceed to describe its construction and mode of operation.

*Construction.*—In the accompanying drawing Figure I is a perspectiv view of the machine when ready for use and is represented in full size. Fig. II is a longitudinal section showing the standard A by which the machine is made fast in a block or held in a vise. In this section is shown the elevating screws D D which pass through the bedplate, also the tongue K in the center of the top of the bedpiece for purposes hereinafter explained. In Fig. III, III at B B is shown the construction of the slide in which the anvil H is placed, over which the saw teeth are bent in the operation of setting, also the reverse side of this slide shows the groove K which guides this slide on the bedpiece by means of the tongue K above referred to. In Fig. IV at E E is represented the form of the slides used in setting saws with different sized teeth with angles cut in the end of each of the form and size required. At F Fig. IV is represented the punch or die constructed and arranged to receive the blow for setting the saw tooth as shown at F in Fig. 1.

Having as I think fully described the construction of my machine I will give its mode of operation.

*Operation.*—Having adjusted the machine as represented in Fig. I the saw to be set is placed so that it rests on the elevating screws D D, by which the back of the saw is raised or lowered so as to give the required set to the tooth with the teeth upon the anvil H with tooth to be set directly under the die or punch F and in the angle of the slide E. In this position the blow is struck on the punch at F which completes the operation.

What I claim as my invention and desire to secure by Letters Patent is—

The construction of the slides E substantially as set forth and their arrangement with screws D D and H and punch F operating in the manner described.

ISAAC SPAULDING.

Witnesses:
  M. M. BERRY,
  JOHN B. FELTSHAW.